Nov. 29, 1927.

F. STEBLER 1,651,073

COMBINED RADIAL AND THRUST BEARING

Filed May 24, 1926

Patented Nov. 29, 1927.

1,651,073

UNITED STATES PATENT OFFICE.

FRED STEBLER, OF RIVERSIDE, CALIFORNIA, ASSIGNOR TO STEBLER-PARKER CO., OF RIVERSIDE, CALIFORNIA, A CORPORATION OF CALIFORNIA.

COMBINED RADIAL AND THRUST BEARING.

Application filed May 24, 1926. Serial No. 111,185.

This invention relates, in general, to the class of antifriction bearings and, in particular, to that type of such bearings in which an open ended housing is removably secured through one end to a fixed support, whereby a lubricant confining chamber is formed within the housing, said housing being adapted to receive through its other end the journal of the part to be borne, and to interiorly associate the raceway and antifriction members of the bearing.

More specifically stated, the present invention is an improvement upon that bearing disclosed in Letters Patent of the United States No. 1,572,093, issued to me February 9th, 1926, to which reference may be had if desired.

My present improvement concerns essentially the housing, and lies in such structural form thereof as to secure in simpler and more economical, but yet efficient manner, the association of the raceway and antifriction members of the bearing.

The nature of my present improvement will now be fully ascertained from the following specification, and from the accompanying drawings in which—

Figure 1:
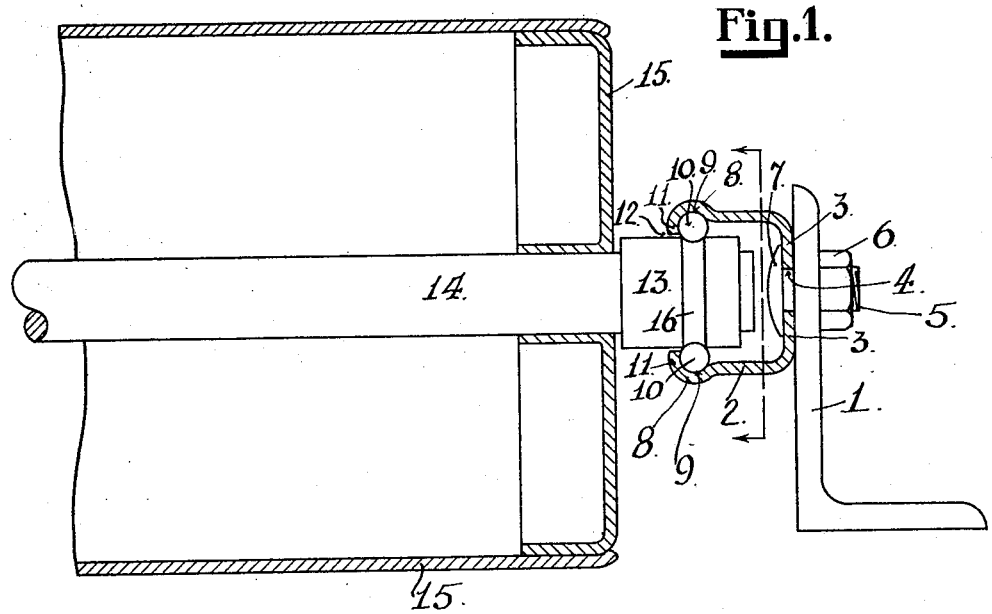
Fig. 1 is a longitudinal section of my improved bearing showing it applied to the part to be borne, which in this instance, by way of example, is indicated as a supporting roller for a traveling conveyer or other moving device.
Figure 2:
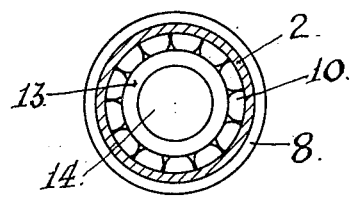
Fig. 2 is a section on the line 2—2 of Fig. 1.

1 is a fixed support. 2 is a housing which, in practice, is best made of pressed metal. The housing has openings at both ends. The outer end is deeply flanged at 3, leaving a relatively small opening 4 through which a bolt 5 passes from the inside outwardly and through the fixed support 1, said bolt receiving a nut 6 on its outer end, the head 7 of the bolt covering the opening 4, and thus forming a chamber within the housing adapted to receive and confine a lubricant.

The opposite end of the housing 2 is circumferentially beaded at 8, its interior surface forming an annular groove 9 constituting one component of a raceway for the balls 10. The inner edge of the bead 8 is carried sufficiently towards the axis of the housing to provide a confining flange or wall 11 for said raceway groove 9 and leave a relatively large opening 12 in that end of the housing to receive the journal 13 of the axis 14 of the roller 15. In the journal 13 is formed the annular groove 16 constituting the other or complemental component of the raceway for the balls 10.

It will thus be seen that this improved radial and thrust bearing comprises but few parts, economical in manufacture, easily assembled and dismembered, and fully effective in function.

I claim:—

An anti-friction bearing comprising a cup-shaped member formed of pressed sheet metal, the inner portion of said cup constituting a lubricant containing chamber and having means for securing said cup member to a bearing support, the outer rim of said cup member being pressed outwardly and then inwardly to form an internal annular groove in the cup itself to confine lubricant within said cup member, said groove constituting an outer ball raceway integral with said cup member, balls in said raceway, and a shaft journal member loosely fitting within said cup shaped member and spaced from the inner wall of said cup, said journal member having an external annular groove constituting the inner raceway for said balls, whereby said journal is held by the cup from longitudinal displacement, and the lubricant within said cup member is confined within the bearing.

In testimony whereof I have signed my name to this specification.

FRED STEBLER.